(12) United States Patent
Tsumagari et al.

(10) Patent No.: US 9,765,662 B2
(45) Date of Patent: Sep. 19, 2017

(54) BURNER

(71) Applicants: HINO MOTORS, LTD., Tokyo (JP); SANGO CO., LTD., Aichi-ken (JP)

(72) Inventors: Ichiro Tsumagari, Hino (JP); Ryo Shibuya, Hino (JP); Atsushi Koide, Miyoshi (JP)

(73) Assignee: Hine Motors, Ltd., Tokyo (JP)

( * ) Notice: Subject to any disclaimer, the term of this patent is extended or adjusted under 35 U.S.C. 154(b) by 0 days.

(21) Appl. No.: 14/420,945

(22) PCT Filed: Aug. 7, 2013

(86) PCT No.: PCT/JP2013/071429
§ 371 (c)(1),
(2) Date: Feb. 11, 2015

(87) PCT Pub. No.: WO2014/027596
PCT Pub. Date: Feb. 20, 2014

(65) Prior Publication Data
US 2015/0204223 A1    Jul. 23, 2015

(30) Foreign Application Priority Data

Aug. 13, 2012 (JP) .................................. 2012-179460
Aug. 30, 2012 (JP) .................................. 2012-190080

(51) Int. Cl.
*F01N 3/025* (2006.01)
*F23D 11/02* (2006.01)
(Continued)

(52) U.S. Cl.
CPC ............ *F01N 3/0253* (2013.01); *B01F 3/022* (2013.01); *B01F 5/0065* (2013.01);
(Continued)

(58) Field of Classification Search
CPC .... F23D 11/406; F23D 11/002; F01N 3/0253; F01N 3/2033
(Continued)

(56) References Cited

U.S. PATENT DOCUMENTS 1,848,990 A     3/1932  Boyd et al.
2,181,261 A *  11/1939  Breese ...................... F23D 5/00
                                                                         138/45
(Continued)

FOREIGN PATENT DOCUMENTS

CN          85200213 U    9/1985
CN          2238967 Y    10/1996
(Continued)

OTHER PUBLICATIONS

Official Action for Australia Patent Application No. 2013300488, mailed Mar. 3, 2015, 3 pages.
(Continued)

*Primary Examiner* — Avinash Savani
*Assistant Examiner* — Deepak Deean
(74) *Attorney, Agent, or Firm* — Sheridan Ross PC

(57) ABSTRACT

A burner includes a tubular inner tube portion and a tubular outer tube portion. The inner tube portion mixes fuel with air. The outer tube portion surrounds the inner tube portion. A peripheral wall of the inner tube portion has a gaseous mixture outflow hole. The gaseous mixture outflow hole causes a clearance between an inner peripheral surface of the outer tube portion and an outer peripheral surface of the inner tube portion to communicate with an interior of the inner tube portion. A peripheral wall of the outer tube portion has an air supplying hole. The air supplying hole further supplies air to the clearance.

9 Claims, 7 Drawing Sheets

(51) Int. Cl.

| | | |
|---|---|---|
| *B01F 5/00* | (2006.01) | |
| *B01F 3/02* | (2006.01) | |
| *F23D 11/44* | (2006.01) | |
| *F23G 7/06* | (2006.01) | |
| *F02B 37/16* | (2006.01) | |
| *F23D 99/00* | (2010.01) | |
| *B01F 5/04* | (2006.01) | |
| *F01N 3/035* | (2006.01) | |
| *F23D 11/40* | (2006.01) | |
| *F01N 3/30* | (2006.01) | |
| *F01N 3/36* | (2006.01) | |
| *F01N 3/38* | (2006.01) | |

(52) U.S. Cl.
CPC ............ *B01F 5/0451* (2013.01); *F01N 3/025* (2013.01); *F01N 3/035* (2013.01); *F02B 37/166* (2013.01); *F23D 11/02* (2013.01); *F23D 11/408* (2013.01); *F23D 11/445* (2013.01); *F23D 91/02* (2015.07); *F23G 7/065* (2013.01); *F01N 3/30* (2013.01); *F01N 3/36* (2013.01); *F01N 3/38* (2013.01); *F01N 2240/14* (2013.01); *Y02T 10/144* (2013.01)

(58) Field of Classification Search
USPC ................. 431/195–201, 338, 340, 342, 352
See application file for complete search history.

(56) References Cited

U.S. PATENT DOCUMENTS

| | | | | |
|---|---|---|---|---|
| 2,304,706 A | * | 12/1942 | Pollock | F23D 5/00 110/260 |
| 2,458,066 A | | 1/1949 | Farkas et al. | |
| 2,806,517 A | * | 9/1957 | Te Nuyl | F23C 3/00 110/260 |
| 2,918,117 A | * | 12/1959 | Griffin | F23C 9/006 431/116 |
| 2,946,651 A | * | 7/1960 | Houdry | B01D 53/944 126/91 A |
| 3,083,525 A | | 4/1963 | Morris | |
| 3,285,316 A | * | 11/1966 | Gustafson | F23D 11/406 236/26 A |
| 3,311,456 A | * | 3/1967 | Denny | F23G 7/066 110/212 |
| 3,523,770 A | * | 8/1970 | Rahm | C10G 9/04 431/353 |
| 3,711,243 A | * | 1/1973 | Zink | F23D 11/002 431/181 |
| 3,733,169 A | * | 5/1973 | Lefebvre | F23D 11/406 239/405 |
| 3,787,169 A | * | 1/1974 | Gjerde | F23B 5/00 239/427 |
| 4,004,875 A | * | 1/1977 | Zink | F23C 7/00 431/116 |
| 4,030,875 A | | 6/1977 | Grondahl et al. | |
| 4,130,388 A | * | 12/1978 | Flanagan | F23C 9/00 431/10 |
| 4,392,813 A | | 7/1983 | Tanaka | |
| 4,538,413 A | | 9/1985 | Shinzawa et al. | |
| 4,543,055 A | | 9/1985 | Tilly | |
| 4,565,380 A | | 1/1986 | Newman et al. | |
| 4,716,725 A | | 1/1988 | Dettling et al. | |
| 4,952,218 A | | 8/1990 | Lipp et al. | |
| 4,982,570 A | | 1/1991 | Waslo et al. | |
| 4,987,738 A | | 1/1991 | Lopez-Crevillen et al. | |
| 5,105,621 A | | 4/1992 | Simmons et al. | |
| 5,140,814 A | | 8/1992 | Kreutmair et al. | |
| 5,216,885 A | * | 6/1993 | Taniguchi | F01K 23/10 60/737 |
| 5,293,743 A | | 3/1994 | Usleman et al. | |
| 5,320,523 A | * | 6/1994 | Stark | F01N 3/2033 431/158 |
| 5,339,630 A | | 8/1994 | Pettit | |
| 5,370,526 A | | 12/1994 | Buschulte et al. | |
| 5,450,869 A | | 9/1995 | Brittain et al. | |
| 5,826,428 A | * | 10/1998 | Blaschke | F01N 3/025 60/303 |
| 5,975,887 A | * | 11/1999 | Kamal | F23C 7/002 431/10 |
| 5,993,197 A | * | 11/1999 | Alber | F23D 3/40 29/890.02 |
| 6,102,687 A | * | 8/2000 | Butcher | F23D 11/106 239/431 |
| 6,131,960 A | | 10/2000 | McHughs | |
| 6,238,206 B1 | * | 5/2001 | Cummings, III | F23D 14/24 431/10 |
| 6,540,505 B1 | | 4/2003 | Wuest | |
| 7,685,811 B2 | | 3/2010 | Taylor et al. | |
| 7,980,069 B2 | * | 7/2011 | Arellano | F01N 3/025 60/274 |
| 9,027,332 B2 | | 5/2015 | Olivier | |
| 2002/0136997 A1 | * | 9/2002 | Wolf | F23M 9/06 431/258 |
| 2003/0022123 A1 | * | 1/2003 | Wolf | F23D 11/103 431/354 |
| 2003/0079467 A1 | | 5/2003 | Liu | |
| 2005/0150215 A1 | * | 7/2005 | Taylor, III | F01N 13/011 60/295 |
| 2006/0130469 A1 | | 6/2006 | Baeuerle et al. | |
| 2008/0307780 A1 | | 12/2008 | Iverson | |
| 2009/0158720 A1 | | 6/2009 | Krause et al. | |
| 2011/0061369 A1 | | 3/2011 | Yetkin et al. | |
| 2012/0322012 A1 | | 12/2012 | Tsumagari et al. | |

FOREIGN PATENT DOCUMENTS

| | | |
|---|---|---|
| CN | 1040861 | 3/1999 |
| CN | 1441198 A | 9/2003 |
| CN | 102159890 | 8/2011 |
| CN | 202024329 U | 11/2011 |
| DE | 4440716 | 7/1996 |
| EP | 0031279 A1 | 7/1981 |
| EP | 2075426 | 7/2009 |
| FR | 2438234 | 4/1980 |
| FR | 2540974 A1 | 8/1984 |
| GB | 2035538 | 6/1980 |
| JP | 58160726 A | 9/1983 |
| JP | 5954707 U | 4/1984 |
| JP | 5993913 A | 5/1984 |
| JP | 6058810 U | 4/1985 |
| JP | 60162213 U | 10/1985 |
| JP | 6129010 U | 2/1986 |
| JP | 61280305 A | 12/1986 |
| JP | 4350315 A | 12/1992 |
| JP | 684118 U | 12/1994 |
| JP | 200349636 A | 2/2003 |
| JP | 200941852 A | 2/2009 |
| JP | 4393858 | 1/2010 |
| JP | 2011157824 A | 8/2011 |
| JP | 2011185493 A | 9/2011 |
| WO | WO2011/034884 A1 | 3/2011 |

OTHER PUBLICATIONS

International Preliminary Report on Patentability for International (PCT) Patent Application No. PCT/JP2013/071429, dated Feb. 17, 2015, 10 pages.
International Search Report prepared by the Japanese Patent Office on Sep. 4, 2013, for International Application No. PCT/JP2013/071428.
Partial Search Report for European Patent Application No. 13828740.4, dated Jun. 29, 2015, 7 pages.
Partial Search Report for European Patent Application No. 13828197.7, dated Jun. 26, 2015, 7 pages.
Official Action for U.S. Appl. No. 14/419,521, mailed Nov. 5, 2015 15 pages.
Official Action for U.S. Appl. No. 14/419,521, mailed Mar. 24, 2016 15 pages.

(56) References Cited

OTHER PUBLICATIONS

Official Action for European Patent Application No. 13828197.7, dated Oct. 11, 2016, 5 pages.
Notice of Allowance for U.S. Appl. No. 14/419,521, mailed Nov. 14, 2016 14 pages.
Official Action for European Patent Application No. 13827901.3, dated Apr. 26, 2017, 8 pages.

* cited by examiner

BURNER

CROSS REFERENCE TO RELATED APPLICATIONS

This application is a national stage application under 35 U.S.C. 371 and claims the benefit of PCT Application No. PCT/JP2013/071429 having an international filing date of Aug. 7, 2013, which designated the United States, which PCT application claimed the benefit of Japanese Patent Application No. 2012-179460 filed Aug. 13, 2012, and Japanese Patent Application No. 2012-190080 filed Aug. 30, 2012, the disclosures of each of which are incorporated herein by reference.

TECHNICAL FIELD

The present disclosed technique relates to a burner including a tube portion which mixes fuel with air.

BACKGROUND ART

An engine exhaust gas purification apparatus which traps fine particles in exhaust gas with a diesel particulate filter (hereinafter referred to as a filter) has been widely used. In this exhaust gas purification apparatus, the function of the filter needs to be maintained by removing fine particles from the filter while the filter traps fine particles in exhaust gas to purify the exhaust gas. To this end, an exhaust gas purification apparatus including a burner which heats exhaust gas is proposed as described in patent document 1. In this exhaust gas purification apparatus, exhaust gas is heated through burning of fuel in the burner to raise the temperature of a filter to the extent that allows for soot, which is a major component of fine particles, to be removed. Removal of fine particles deposited on the filter recovers the function of the filter.

PRIOR ART DOCUMENT

Patent Document

Patent document 1: Japanese Laid-Open Patent Publication No. 2011-157824

SUMMARY OF THE INVENTION

When the engine side of the burner is assumed to be the upstream side in terms of an exhaust gas flowing direction, and the filter side of the burner is assumed to be the downstream side, fuel used to heat exhaust gas is supplied from the upstream side of the burner toward the downstream side. Air used to burn fuel is also supplied from the upstream side of the burner toward the downstream side. In this fuel and air supply system, however, sufficient air is not supplied to fuel, and a portion of the fuel supplied to the burner is exhausted in an unburned state. For this reason, the above-described burner is desired to have higher fuel combustion efficiency.

It is an object of the present disclosed technique to provide a burner capable of improving fuel combustion efficiency.

One aspect of a burner according to the present disclosure includes a tubular inner tube portion which mixes fuel with air and a tubular outer tube portion which surrounds the inner tube portion. A peripheral wall of the inner tube portion has a gaseous mixture outflow hole. The gaseous mixture outflow hole causes a clearance between an inner peripheral surface of the outer tube portion and an outer peripheral surface of the inner tube portion to communicate with an interior of the inner tube portion. A peripheral wall of the outer tube portion has an air supplying hole. The air supplying hole further supplies air to the clearance.

In the one aspect of the burner according to the present disclosure, a portion of gaseous mixture inside the inner tube portion enters the clearance between the inner tube portion and the outer tube portion through the gaseous mixture outflow hole. Air also enters the clearance between the inner tube portion and the outer tube portion through the air supplying hole. That is, into the clearance between the inner tube portion and the outer tube portion, gaseous mixture enters from the inner tube portion while air enters from the outer tube portion. Gaseous mixture and air enter the above-described clearance from directions different from each other. For this reason, the probability of a collision of gaseous mixture with air is higher than in a configuration in which fuel contained in gaseous mixture and air flow in directions identical to each other. This makes fuel and air likely to be mixed, which results in suppression of insufficiency of air with respect to fuel. The fuel combustion efficiency is thus improved.

In another aspect of the burner according to the present disclosure, the inner tube portion includes a proximal end which is a tube end supplied with the fuel and a distal end which is a tube end on the opposite side of the proximal end. The inner tube portion includes a plate-like lid which covers the distal end.

In the another aspect of the burner according to the present disclosure, gaseous mixture inside the inner tube portion is suppressed from flowing out from the distal end to outside the inner tube portion by the lid. For this reason, gaseous mixture inside the inner tube portion is more likely to enter the above-described clearance through the gaseous mixture outflow hole. The quantity of gaseous mixture which impinges on air in the above-described clearance is larger than in a configuration without the above-described lid on the assumption that the quantity of gaseous mixture inside the inner tube portion is the same. This more effectively suppresses insufficiency of air with respect to fuel, which further improves the fuel combustion efficiency.

In another aspect of the burner according to the present disclosure, the gaseous mixture outflow hole is formed at a part of the inner tube portion closer to the distal end than a middle in an axial direction of the inner tube portion. The air supplying hole is formed at a part of the outer tube portion that faces a part of the inner tube portion closer to the proximal end than the middle in the axial direction of the inner tube portion.

In the another aspect of the burner according to the present disclosure, gaseous mixture inside the inner tube portion enters the above-described clearance from the distal end side of the inner tube portion. In contrast, air passing through the air supplying hole enters the above-described clearance from a position closer to the proximal end than a position where gaseous mixture enters the above-described clearance. That is, gaseous mixture is supplied to a destination to which air entering the above-described clearance flows. Of air entering the above-described clearance, air flowing along the outer peripheral surface of the inner tube portion impinges on the gaseous mixture entering the above-described clearance from a substantially orthogonal direction. For this reason, the gaseous mixture and air are more likely to be mixed than in a configuration where the gases impinge in a cross direction other than an orthogonal direction.

In another aspect of the burner according to the present disclosure, the inner tube portion has a plurality of the gaseous mixture outflow holes. The plurality of the gaseous mixture outflow holes is formed to be spaced apart in a circumferential direction of the inner tube portion. The clearance between the outer tube portion and the inner tube portion has a perforated plate attached therein. The perforated plate is formed in the shape of a ring extending along the circumferential direction of the inner tube portion.

In the another aspect of the burner according to the present disclosure, the plurality of gaseous mixture outflow holes is distributed in the circumferential direction, and gaseous mixture is supplied to the entire clearance in the circumferential direction. Since the perforated plate is attached in the clearance, air is also supplied to the entire clearance in the circumferential direction. This suppresses gaseous mixture and air from being supplied to the clearance in an uneven manner in each circumferential direction. As a result, gaseous mixture and air are more likely to be mixed.

Another aspect of the burner according to the present disclosure further includes an air swirl portion which supplies air to the inner tube portion while swirling the air along the circumferential direction of the inner tube portion.

In the another aspect of the burner according to the present disclosure, air is supplied to the inner tube portion while swirling in the circumferential direction. For this reason, fuel and air are more likely to be mixed inside the inner tube portion than in a configuration where air is supplied to the inner tube portion while flowing in the axial direction of the inner tube portion on the assumption that fuel is supplied to the inner tube portion in the same state. Since fuel and air are supplied to the above-described clearance while being mixed better, insufficiency of air with respect to fuel is more effectively suppressed.

Another aspect of the burner according to the present disclosure further includes a fuel supply portion which supplies fuel and a throttle portion arranged between the air swirl portion and the inner tube portion. The throttle portion has a through-hole which extends through the throttle portion along the axial direction of the inner tube portion. A flow passage area of the through-hole is smaller than a flow passage area of the inner tube portion. The fuel supply portion supplies fuel toward the through-hole.

In the another aspect of the burner according to the present disclosure, fuel and air are supplied to the inner tube portion through the through-hole smaller in opening area than the air swirl portion. Fuel and air inside the air swirl portion gather temporarily toward the through-hole, which correspondingly makes fuel and air more likely to be mixed than in a configuration without the throttle portion. Since fuel and air are supplied to the above-described clearance while being mixed better, insufficiency of air with respect to fuel is more effectively suppressed.

Another aspect of the burner according to the present disclosure further includes a combustion chamber defined by the inner peripheral surface of the outer tube portion, a ignition portion which ignites a gaseous mixture of the air and the fuel inside the combustion chamber, and a circulating flow production portion which contacts the gaseous mixture inside the inner tube portion. Fluid inside the combustion chamber impinges on the circulating flow production portion. One of two end portions of the outer tube portion is a discharge port, which discharges burned gas produced through burning of the premixed gas. The circulating flow production portion impinges on the fluid that flows from the ignition portion toward the discharge port and produces a circulating flow at a portion of the fluid. The circulating flow circulates between an upstream side and a downstream side in a direction in which the fluid flows.

In the another aspect of the burner according to the present disclosed technique, since the circulating flow production portion produces a circulating flow of fluid containing unburned fuel inside the combustion chamber, the accumulation period of unburned fuel inside the combustion chamber is longer. This makes fluid likely to be taken into a flame and unburned fuel contained in the fluid likely to be burned. Additionally, the circulating flow circulates between an upstream side and a downstream side in a direction in which fluid flows, at least at a portion of a flow traveling from the ignition portion toward the discharge port. Thus, the concentration distribution of unburned fuel is homogenized in the direction in which the fluid flows. In addition, since the circulating flow production portion contacts a circulating flow inside the combustion chamber, the quantity of heat absorbed from burned gas inside the combustion chamber by the circulating flow production portion is larger than, for example, a case where the circulating flow production portion contacts a laminar flow. For this reason, the circulating flow production portion suppresses liquefaction of vaporized fuel contained in premixed gas and promotes vaporization of liquefied fuel by propagating heat to the premixed gas.

In another aspect of the burner according to the present disclosed technique, the circulating flow production portion includes a baffle plate which impinges on the fluid inside the combustion chamber. The baffle plate is arranged between the inner tube portion and the discharge port in a direction in which the outer tube portion extends. The baffle plate defines a first circulating flow production space between the baffle plate and the outer peripheral surface of the inner tube portion in the combustion chamber. The first circulating flow production space produces the circulating flow on the upstream side of the baffle plate. The baffle plate defines a second circulating flow production space at a downstream of the baffle plate in the combustion chamber. The second circulating flow production space produces the circulating flow.

In the another aspect of the burner according to the present disclosed technique, circulating flow production spaces are formed on the upstream side and on the downstream side, respectively, of the baffle plate. This increases the opportunity for unburned fuel to be taken into a flame and be burned. Additionally, since the baffle plate contacts circulating flows at two surfaces, the quantity of heat absorbed from burned gas by the baffle plate increases further.

In another aspect of the burner according to the present disclosed technique, the circulating flow production portion includes a heat transfer section, which is inserted in the inner tube portion and extends along a direction parallel to a center axis of the inner tube portion.

In the another aspect of the burner according to the present disclosed technique, the heat transfer section suppresses liquefaction of vaporized fuel and promotes vaporization of liquefied fuel, in the entirety of a pre-mixing chamber.

In another aspect of the burner according to the present disclosed technique, a narrow section is formed between a side surface of the baffle plate and the inner peripheral surface of the outer tube portion. A flow passage area of the narrow section is smaller than a flow passage area of the inner peripheral surface of the outer tube portion.

In the another aspect of the burner according to the present disclosed technique, fluid inside the combustion chamber flows to downstream of the baffle plate with increased speed through the narrow section. Diffusion of unburned fuel is thus promoted by reducing the pressure downstream of the baffle plate.

In another aspect of the burner according to the present disclosed technique, a ratio of an outer diameter of the baffle plate to an inner diameter of the outer tube portion is not less than 0.6 and not more than 0.8.

In the another aspect of the burner according to the present disclosed technique, the pressure upstream of the baffle plate is appropriately adjusted. Since the mixing efficiency of fluid is improved, the quantity of unburned fuel discharged from the burner is reduced.

DETAILED DESCRIPTION OF THE PREFERRED EMBODIMENTS

First Embodiment

A first embodiment of a burner will be described with reference to FIGS. 1 to 4. The overall configuration of a diesel engine which is equipped with a burner will be described with reference to FIG. 1. A path of air taken into the diesel engine and a path of air discharged from the diesel engine will be mainly described here. Hereinafter, the intake air supply side is referred to as the upstream side with respect to the object to be explained, while the exhaust gas discharge side is referred to as the downstream side with respect to the object to be explained.

Schematic Configuration of Diesel Engine

Figure 1:
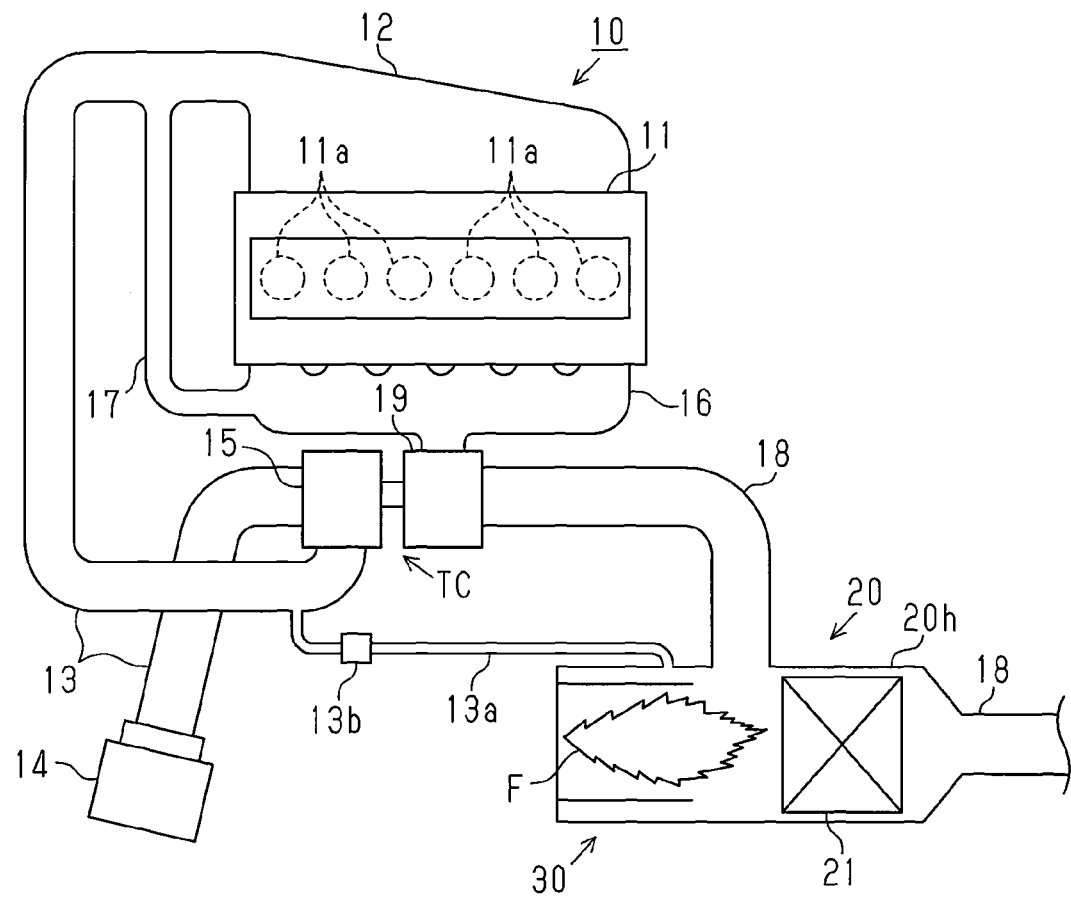
FIG. 1 is a block diagram showing the overall configuration of a diesel engine equipped with a burner, according to a first embodiment of the burner in the present disclosure.

As shown in FIG. 1, six cylinders 11a which are arranged in a row are formed at a cylinder block 11 of a diesel engine 10. An intake manifold 12 for supplying intake air to the cylinders 11a and an exhaust manifold 16 into which exhaust gas from the cylinders 11a flows are connected to the six cylinders 11a.

An air cleaner 14 is attached to an upstream end of an inlet pipe 13. The inlet pipe 13 serves as a path of intake air and is attached to the intake manifold 12. A compressor 15 of a turbocharger TC is attached on the way of the inlet pipe 13. An exhaust pipe 18 serving as a path of exhaust gas is connected to the exhaust manifold 16. An EGR pipe 17 is connected to the exhaust manifold 16. The EGR pipe 17 connects the inlet pipe 13 and the exhaust manifold 16 to cause exhaust gas to flow into the inlet pipe 13. A turbine 19 which is coupled to the above-described compressor 15 is connected to the upstream side of the exhaust pipe 18. The exhaust pipe 18 is equipped with an exhaust gas purification apparatus 20 on the way of the exhaust pipe 18. The exhaust gas purification apparatus 20 purifies exhaust gas by removing fine particles (e.g., soot) in the exhaust pipe 18.

A filter 21, which traps fine particles contained in exhaust gas is provided in a housing 20h of the exhaust gas purification apparatus 20. A burner 30 for heating exhaust gas is arranged upstream of the filter 21. The filter 21 has, for example, a honeycomb structure which is made of porous ceramic and traps fine particles in exhaust gas at an inner wall surface of a columnar body constituting the honeycomb structure. The exhaust pipe 18 on the upstream side of the exhaust gas purification apparatus 20, the exhaust pipe 18 on the downstream side of the exhaust gas purification apparatus 20, and an air supplying pipe 13a are connected to the housing 20h. The air supplying pipe 13a is connected to the burner 30 and to the inlet pipe 13 downstream of the compressor 15. An air valve 13b is attached on the way of the air supplying pipe 13a. Intake air flows from the inlet pipe 13 into the exhaust gas purification apparatus 20 via the air supplying pipe 13a while the air valve 13b is open. When the air valve 13b is closed, inflow of intake air from the inlet pipe 13 into the exhaust gas purification apparatus 20 is stopped.

Configuration of Burner

The configuration of the burner 30 will be described with reference to FIGS. 2 and 3.

Figure 2:
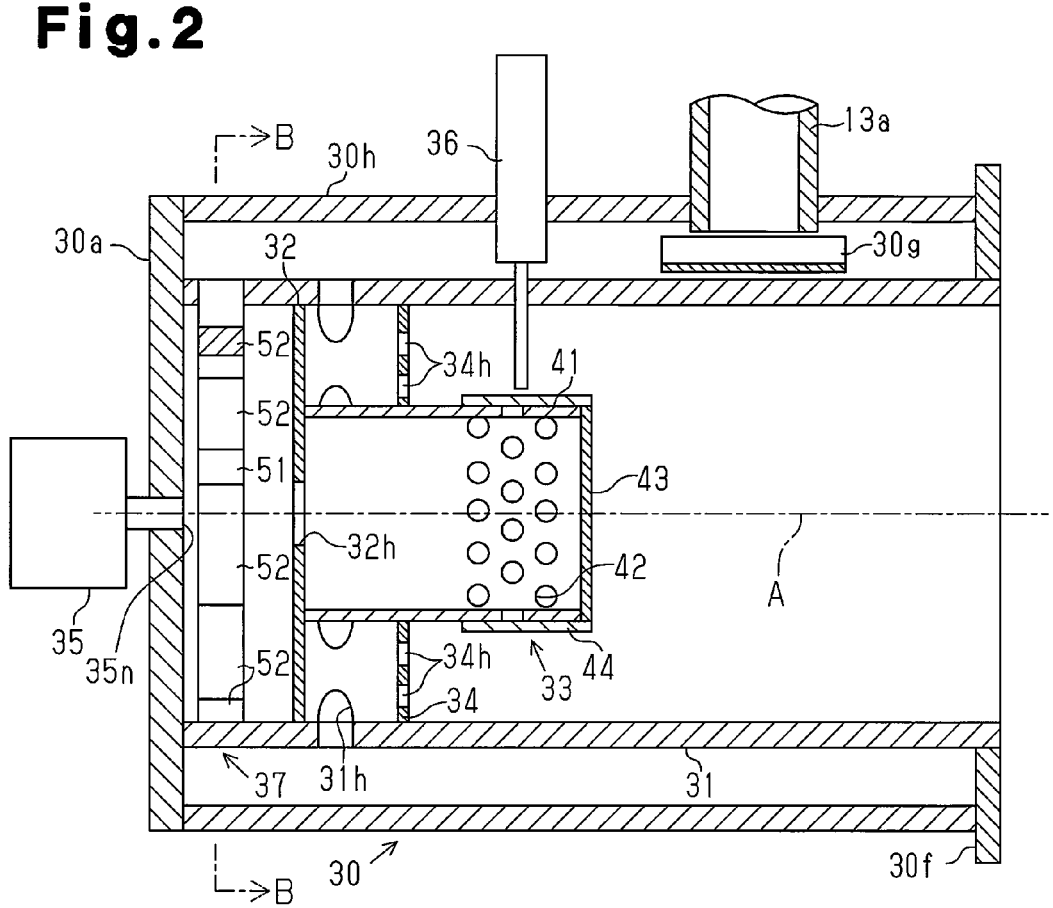
FIG. 2 is a cross-sectional view showing the cross-section structure of the burner according to the first embodiment.

As shown in FIG. 2, a burner housing 30h has a circular tube shape and constitutes the burner 30. The air supplying pipe 13a that extends along a radial direction of the burner housing 30h is connected to the medial region of the burner housing 30h in an axial direction in which a center axis A of the burner housing 30h extends. An air guide plate 30g is attached to a part which faces an opening of the air supplying pipe 13a inside the burner housing 30h. The air guide plate 30g is formed in the shape of a plate such that the distance from the opening of the air supplying pipe 13a increases gradually along a circumferential direction of the burner housing 30h. Air supplied through an opening that is formed by the air guide plate 30g and an inner peripheral surface of the burner housing 30h impinges on the air guide plate 30g and is guided along the circumferential direction of the burner housing 30h into an interior of the burner housing 30h.

An outer tube portion 31 which is formed in the shape of a circular tube concentric with the burner housing 30h is fixed to a housing sidewall 30a which is an endwall on the opposite side of the burner housing 30h from the filter 21. A clearance is formed between an outer peripheral surface of the outer tube portion 31 and the inner peripheral surface of the burner housing 30h.

A circular ring-shaped housing flange portion 30f is fixed to an end portion of the outer peripheral surface of the outer tube portion 31; the end portion located closer to the filter 21. The housing flange portion 30f extends outward in a radial direction of the outer tube portion 31. The housing flange portion 30f is fixed to an end portion of the burner housing 30h opposite to the housing sidewall 30a. The clearance between the inner peripheral surface of the burner housing 30h and the outer peripheral surface of the outer tube portion 31 is enclosed with the housing sidewall 30a and the housing flange portion 30f.

The housing flange portion 30f is coupled to the upstream side of a filter housing which is formed in the shape of a circular tube concentric with the burner housing 30h. The burner housing 30h and the filter housing constitute the housing 20h of the exhaust gas purification apparatus 20.

A throttle plate 32 serving as an example of a throttle portion which is formed in the shape of a circular ring concentric with the outer tube portion 31 is fixed to an inner peripheral surface of the outer tube portion 31. A mixing inner tube portion 33 serving as an example of an inner tube portion which is formed in the shape of a circular tube concentric with the outer tube portion 31 is fixed to a surface of the throttle plate 32 located closer to the housing flange portion 30f. A clearance is formed between the mixing inner tube portion 33 and the outer tube portion 31.

A ring-shaped perforated plate 34 is fixed to an outer peripheral surface of the mixing inner tube portion 33 and located in an axial direction on the way of the mixing inner tube portion 33. The ring-shaped perforated plate 34 extends outward in a radial direction of the mixing inner tube portion 33. The outer diameter of the perforated plate 34 is almost equal to the inner diameter of the outer tube portion 31. A side surface of the perforated plate 34 is fixed to the inner peripheral surface of the outer tube portion 31. A plurality of air diffusion holes 34h which extend through the perforated plate 34 along an axial direction are formed in the perforated plate 34. The plurality of air diffusion holes 34h are formed on the entirety of the perforated plate 34 and arranged in a circumferential direction to be spaced apart from each other.

A plurality of air supplying holes 31h are formed at a peripheral wall of the outer tube portion 31 to be equally spaced apart from each other in the circumferential direction. The air supplying holes 31h are arranged between an axial position of the outer tube portion 31 where the throttle plate 32 is fixed and an axial position of the outer tube portion 31 where the perforated plate 34 is fixed. The air supplying holes 31h extend between the inner peripheral surface and the outer peripheral surface of the outer tube portion 31.

One mixing hole 32h which is a circular hole concentric with the throttle plate 32 is formed in the throttle plate 32. An injection port 35n of a fuel supply portion 35 is fixed to a position of the housing sidewall 30a which faces the mixing hole 32h. The fuel supply portion 35 is connected to, for example, a fuel tank of the diesel engine 10. The fuel supply portion 35 injects fuel which is supplied from the fuel tank into the outer tube portion 31 in a vaporized state.

The injection port 35n is formed, for example, of a plurality of openings and is arranged in a radial direction from the above-described center axis A. The distance between the injection port 35n and the mixing hole 32h is set to a distance which allows fuel injected from the injection port 35n to pass through the mixing hole 32h.

A tubular portion 41 constituting the mixing inner tube portion 33 is formed in the shape of a circular tube concentric with the outer tube portion 31. A plurality of gaseous mixture outflow holes 42 which extend through a radial direction between an inner peripheral surface and an outer peripheral surface of the tubular portion 41 are formed closer to the filter 21 than a middle in an axial direction of the tubular portion 41 in a peripheral wall of the tubular portion 41. In the tubular portion 41, three rows of holes which include the plurality of gaseous mixture outflow holes 42 arranged along a circumferential direction of the tubular portion 41 are aligned along the axial direction of the tubular portion 41. Each gaseous mixture outflow hole 42 of one row of holes which is formed at a position closest to the housing sidewall 30a among the three rows of holes overlaps in the axial direction with any one of the gaseous mixture outflow holes 42 included in one row of holes which is formed at a position closest to the filter 21. Each gaseous mixture outflow hole 42 of the row of holes that is located between the row of holes formed at the position closest to the housing sidewall 30a and the row of holes formed at the position closest to the filter 21 does not overlap in the axial direction with the gaseous mixture outflow holes 42 included in the other rows of holes.

A lid 43 which is formed in the shape of a disk concentric with the tubular portion 41 is attached to an end portion of the tubular portion 41 closer to the filter 21. The diameter of the lid 43 is almost equal to the outer diameter of the tubular portion 41, and the end portion of the tubular portion 41 closer to the filter 21 is enclosed with the lid 43.

A flame suppression portion 44 which is formed in the shape of a circular tube concentric with the tubular portion 41 is attached to the outer peripheral surface of the tubular portion 41 closer to the filter 21 than the middle in the axial direction of the tubular portion 41. The flame suppression portion 44 covers an opening formed in the outer peripheral surface of the tubular portion 41 in each of the plurality of gaseous mixture outflow holes 42 and a side surface of the lid 43. The flame suppression portion 44 is, for example, a wire net which is made of various metals. Each opening in the flame suppression portion 44 is smaller than the diameter of the gaseous mixture outflow hole 42 and is small enough to prevent a flame produced outside the flame suppression portion 44 from passing through the flame suppression portion 44 toward inside. Each opening in the flame suppression portion 44 is large enough to allow gaseous mixture produced in the mixing inner tube portion 33 to pass through.

A distal end which is one end of an ignition section 36 is arranged closer to the filter 21 than the middle in the axial direction of the tubular portion 41 and is arranged outside the outer peripheral surface of the tubular portion 41 in the radial direction. The distal end of the ignition section 36 is preferably arranged so as to face any one of the gaseous mixture outflow holes 42. The ignition section 36 is fixed to the outer tube portion 31 and the burner housing 30h.

An air swirl portion 37 is formed at a part of the outer tube portion 31 located between the housing sidewall 30a and the throttle plate 32. The air swirl portion 37 is arranged on an entire portion in the circumferential direction of the outer tube portion 31.

Figure 3:
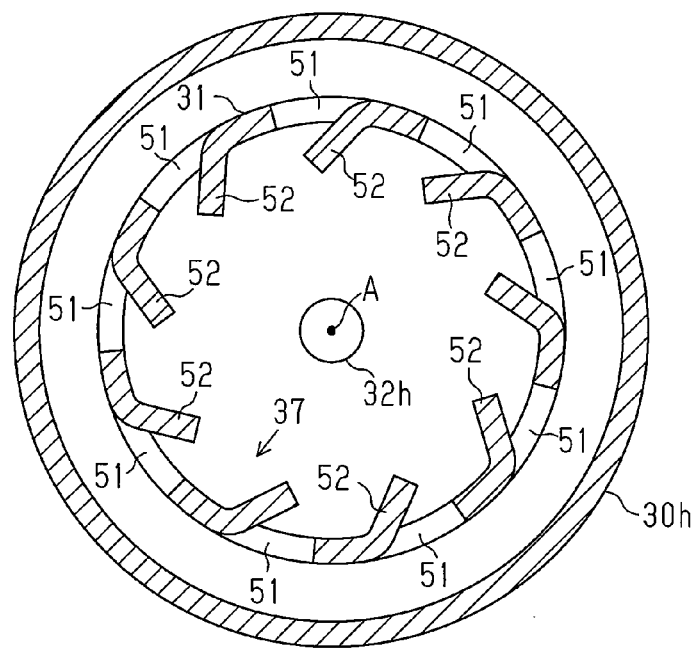
FIG. 3 is a cross-sectional view showing the cross-sectional structure of the burner according to the first embodiment, taken along line B-B in FIG. 2.

As shown in FIG. 3, the air swirl portion 37 includes a plurality of swirl holes 51 and bending portions 52 equal in number to the swirl holes 51. The plurality of swirl holes 51 are equally spaced in the circumferential direction of the outer tube portion 31, and each swirl hole 51 is formed in the shape of a rectangular hole. The plurality of bending portions 52 are each formed in the shape of a plate which is folded toward an interior of the outer tube portion 31 from one side portion in the circumferential direction of the corresponding swirl hole 51. Air entering the air swirl portion 37 through each swirl hole 51 is guided along the bending portion 52 and swirls inside the air swirl portion 37. A direction in which each bending portion 52 is inclined with respect to the inner peripheral surface of the outer tube portion 31 is the same as a direction in which the air guide plate 30g is inclined with respect to the burner housing 30h.

Operation of Burner

Figure 4:
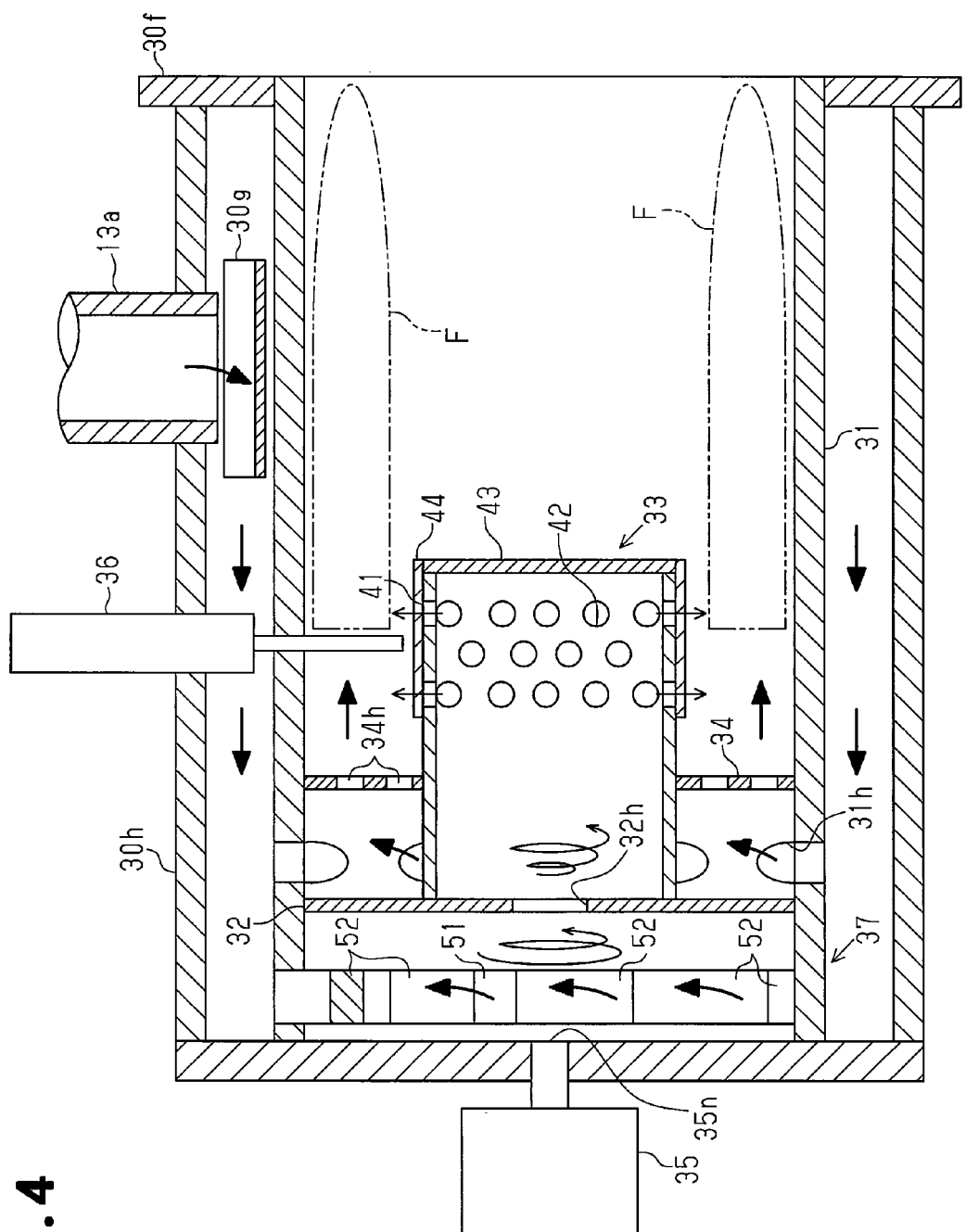
FIG. 4 is a view showing a flow of fluid in the burner according to the first embodiment.

Burning of fuel in the burner 30 will be described with reference to FIG. 4. In FIG. 4, thick arrows indicate the flow of air supplied from the air supplying pipe 13a to the burner 30, and thin arrows indicate the flow of a gaseous mixture of the air and fuel injected from the fuel supply portion 35. Chain double-dashed lines indicate flames produced through burning of the fuel in FIG. 4.

As shown in FIG. 4, when fuel is to be burned, air from the air supplying pipe 13a first passes through the clearance between the inner peripheral surface of the burner housing 30h and the outer peripheral surface of the outer tube portion 31 and flows toward the housing sidewall 30a. For this reason, after burning of the fuel is started in the burner 30, the air is exposed to heat from the outer tube portion 31 heated by a flame F and is heated.

Additionally, since air supplied into the burner 30 impinges on the air guide plate 30g, a flow of air along the radial direction of the burner housing 30h is converted into a flow of air along the circumferential direction of the burner housing 30h. With the conversion, the air supplied into the burner 30 flows toward the housing sidewall 30a through the clearance between the inner peripheral surface of the burner housing 30h and the outer peripheral surface of the outer tube portion 31 along the circumferential direction of the burner housing 30h. A distance along which air flows inside the clearance is longer than in a configuration where air supplied into the burner 30 does not swirl along the circumferential direction of the burner housing 30h. Thus, the temperature of air is higher in the configuration with the air guide plate 30g.

An end of the clearance located closer to the filter 21 is enclosed with the housing flange portion 30f. This suppresses a portion of the air supplied from the air supplying pipe 13a to the burner 30 from flowing out to the filter 21.

A portion of the air flowing toward the housing sidewall 30a flows into the outer tube portion 31 through the swirl holes 51 formed at an end portion of the outer tube portion 31 located closer to the housing sidewall 30a. At this time, since the air flowing into the outer tube portion 31 flows into the outer tube portion 31 while being guided by the bending portions 52, a flow of air is converted into a swirling flow which decreases in swirling radius while swirling along the inner peripheral surface of the outer tube portion 31. The air flowing into the outer tube portion 31 flows toward the mixing hole 32h of the throttle plate 32 while swirling inside the outer tube portion 31.

When injection of fuel from the fuel supply portion 35 is started, vaporized fuel is injected from the injection port 35n toward the mixing hole 32h of the throttle plate 32. At this time, air flowing inside the outer tube portion 31 also flows toward the mixing hole 32h. The fuel passing through the mixing hole 32h is mixed with air passing through the mixing hole 32h in the vicinity of the mixing hole 32h. Since air passing through the mixing hole 32h passes through the mixing hole 32h while swirling, fuel and air are more likely to be mixed in the vicinity of the mixing hole 32h than in a configuration where air passing through the mixing hole 32h simply flows along the axial direction.

Gaseous mixture passing through the mixing hole 32h flows into the mixing inner tube portion 33. Since the flow passage area of the tubular portion 41 is larger than the flow passage area of the mixing hole 32h, a flow of gaseous mixture which is temporarily limited by the mixing hole 32h increases in swirling radius again while swirling. Since gaseous mixture is kept in a swirling state even after the gaseous mixture flows into the mixing inner tube portion 33, as described above, air and fuel contained in the gaseous mixture are mixed even inside the mixing inner tube portion 33. Thus, fuel and air are more likely to be mixed than in a configuration where gaseous mixture flows along the axial direction inside the mixing inner tube portion 33. The gaseous mixture flowing while swirling inside the mixing inner tube portion 33 reaches the gaseous mixture outflow holes 42 formed in the tubular portion 41 and flows out to outside the tubular portion 41 in the radial direction through the gaseous mixture outflow holes 42. With this operation, the gaseous mixture is supplied to a clearance formed by the outer peripheral surface of the mixing inner tube portion 33 and the inner peripheral surface of the outer tube portion 31. The flow passage area of the mixing hole 32h is the area of the mixing hole 32h in cross-section orthogonal to the center axis A. Similarly, the flow passage area of the tubular portion 41 is the area of the tubular portion 41 in cross-section orthogonal to the center axis A.

A portion of the air supplied from the air supplying pipe 13a into the burner 30 flows into a space which is located between the throttle plate 32 and the perforated plate 34 of a clearance between the outer tube portion 31 and the tubular portion 41 through the air supplying holes 31h on the way to the housing sidewall 30a. The air flowing through the air supplying holes 31h passes through the air diffusion holes 34h formed in the perforated plate 34 and flows out into the clearance between the tubular portion 41 and the outer tube portion 31. As described above, air flows toward the filter 21 through the plurality of air supplying holes 31h equally spaced in the circumferential direction of the outer tube portion 31 and the plurality of air diffusion holes 34h formed on the entire of the perforated plate 34 in the circumferential direction. For this reason, the quantity of air flowing through the clearance between the outer tube portion 31 and the tubular portion 41 is suppressed from becoming uneven in the circumferential direction of the outer tube portion 31.

At a destination to which air flows through the perforated plate 34, the gaseous mixture flows out to the outside of the tubular portion 41 in the radial direction through the gaseous mixture outflow holes 42 formed in the tubular portion 41, as described above. At this time, the flow of the air flowing from the perforated plate 34 toward the filter 21 and the flow of the gaseous mixture flowing out through the gaseous mixture outflow holes 42 cross each other. This increases the probability of collision of the gases with each other. In contrast, in, for example, a configuration where a gaseous mixture and air to be added to the gaseous mixture flow in the same direction, it is often the case that a portion of a flow of gaseous mixture overlaps with a flow of air while the other portion of the flow of gaseous mixture does not overlap with the flow of air.

Gaseous mixture and air are more likely to be mixed in the configuration where gaseous mixture and air join from directions crossing each other than in the configuration where air and gaseous mixture flow in the same direction.

This suppresses unburned fuel from being produced due to insufficiency of the quantity of air with respect to the quantity of fuel to be burned in the burner 30.

For example, a burner in which the plurality of gaseous mixture outflow holes 42 are formed not in a peripheral surface of the tubular portion 41 but in only the lid 43 is a reference example. In the reference example, gaseous mixture and air to be added to the gaseous mixture flow in the same direction. The operating conditions of the diesel engine 10 and the drive conditions of the burner were made identical to those in the present embodiment, and the quantity of unburned fuel in the present embodiment and that in the reference example were measured. The quantity of unburned fuel in the present embodiment was found to be 30% smaller than that in the reference example.

The flame F produced upon ignition to gaseous mixture flowing out through the gaseous mixture outflow holes 42 cannot pass through each opening of the flame suppression portion 44. Additionally, contact of the flame F with the flame suppression portion 44 causes heat exchange between the flame F and the flame suppression portion 44. This suppresses the flame F from passing through the gaseous mixture outflow holes 42 and expanding to inside the tubular portion 41.

As has been described above, the burner according to the present embodiment can achieve the effects (advantages) listed below.

(1) A portion of the gaseous mixture supplied to the clearance between the tubular portion 41 and the outer tube portion 31 and a portion of the air flow through the clearance in directions different from each other. This increases the probability of collision of the portion of the gaseous mixture with the portion of the air. This makes fuel and air likely to be mixed and suppresses insufficiency of air with respect to fuel, which improves the combustion efficiency of fuel.

(2) Gaseous mixture entering the tubular portion 41 is suppressed by the lid 43 from flowing out to outside the tubular portion 41 through an opening portion of the tubular portion 41 located closer to the filter 21. For this reason, most of gaseous mixture entering the tubular portion 41 flows out into the clearance between the tubular portion 41 and the outer tube portion 31 through the gaseous mixture outflow holes 42. This leads to an increase in the quantity of gaseous mixture which impinges on the air having passed through the perforated plate 34. This more effectively suppresses insufficiency of air with respect to fuel and further improves the combustion efficiency of fuel.

(3) Gaseous mixture entering the tubular portion 41 flows out to outside the tubular portion 41 in the radial direction through the gaseous mixture outflow holes 42. Air flowing toward the filter 21 through the clearance between the tubular portion 41 and the outer tube portion 31 flows from a position closer to the housing sidewall 30a than a position where gaseous mixture flows out to the outside in the above-described radial direction. For this reason, gaseous mixture flowing out through the gaseous mixture outflow holes 42 impinges unfailingly on air flowing through the clearance between the tubular portion 41 and the outer tube portion 31. Additionally, since a direction along which gaseous mixture flows and a direction along which air to be joined with the gaseous mixture flows are almost orthogonal, gaseous mixture and air are more likely to be mixed, which in turn improves the combustion efficiency of fuel.

(4) Since the plurality of gaseous mixture outflow holes 42 are distributed in the circumferential direction, gaseous mixture is supplied to the entire clearance in a circumferential direction. Additionally, since the perforated plate 34 is attached in the clearance, air is also supplied to the entire clearance in the circumferential direction. This suppresses gaseous mixture and air from being supplied to the clearance in uneven manners in each circumferential direction. As a result, gaseous mixture and air are more likely to be mixed.

(5) Since air supplied to the air swirl portion 37 is supplied to the mixing inner tube portion 33 while swirling in a circumferential direction, fuel and air are more likely to be mixed inside the mixing inner tube portion 33. Thus, fuel and air are supplied to the clearance while being mixed better, which more effectively suppresses insufficiency of air with respect to fuel.

(6) Fuel and air supplied to the air swirl portion 37 are supplied to the mixing inner tube portion 33 through the mixing hole 32h smaller in opening area than the air swirl portion 37. Fuel and air inside the air swirl portion 37 gather temporarily toward the mixing hole 32h, which makes fuel and air more likely to be mixed. Since fuel and air are supplied to the above-described clearance while being mixed better, insufficiency of air with respect to fuel is more effectively suppressed.

(7) Air used to burn fuel is supplied into the outer tube portion 31 while being heated in the clearance between the inner peripheral surface of the burner housing 30h and the outer peripheral surface of the outer tube portion 31. This raises the temperature where fuel is burned. Fuel is thus more likely to be burned than in a configuration where unheated air is supplied.

(8) Gaseous mixture supplied to the mixing inner tube portion 33 is heated by the flame F produced outside the mixing inner tube portion 33. For this reason, even if fuel is not sufficiently vaporized by the fuel supply portion 35, the fuel is vaporized inside the mixing inner tube portion 33, which makes the fuel more likely to be burned.

Second Embodiment

A second embodiment of a burner will be described with reference to FIGS. 5 to 8. A burner according to the second embodiment is different from the burner according to the first embodiment and includes a member which produces a circulating flow in a space surrounded by the outer tube portion 31. Such differences will be described below in detail. The configuration of the burner and the operation of the burner will be described in this order.

Configuration of Burner

Figure 5:
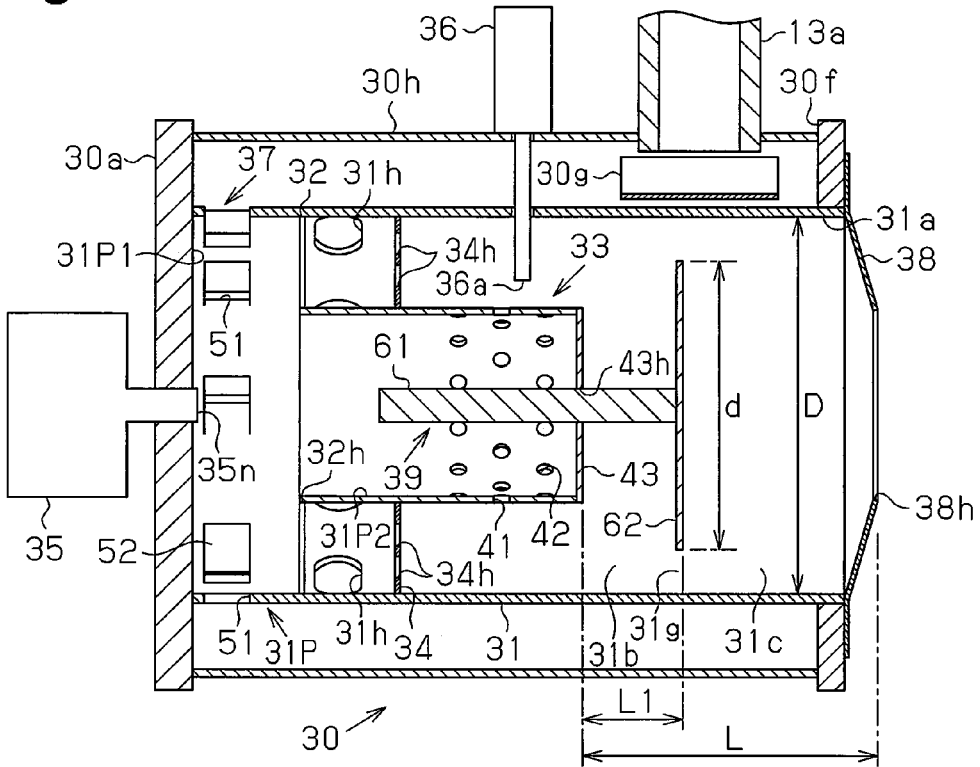
FIG. 5 is a cross-sectional view showing the cross-section structure of a second embodiment of a burner according to the present disclosure.

The configuration of the burner will be described with reference to FIG. 5. FIG. 5 is a cross-sectional view of the burner corresponding to FIG. 2 described in the first embodiment and that components equivalent to those in FIG. 2 are denoted by identical reference numerals.

As shown in FIG. 5, a substantially circular ring-shaped blow-off plate 38 is provided at an opening of a cylinder end closer to the DPF 21 of two end portions of a second tube portion 31. A discharge port 38h which extends through the blow-off plate 38 in an axial direction is formed at a middle of the blow-off plate 38. The second tube portion 31 corresponds to the outer tube portion 31 according to the first embodiment, and the DPF 21 corresponds to the filter 21 according to the first embodiment.

One circular insertion hole 43h which extends through a lid 43 in an axial direction is formed on the lid 43. A baffle portion 39 serving as an example of a circulating flow production portion is fixed to the insertion hole 43h. The baffle portion 39 includes a heat transfer portion 61 which is elongated, i.e., extends along an axial direction and a baffle plate 62 which is coupled to a distal end of the heat transfer portion 61. The heat transfer portion 61 is formed in the shape of a rod and is inserted in the insertion hole 43h. Substantially a middle in a longitudinal direction, i.e., almost a middle in an axial direction of the heat transfer portion 61 is supported by the lid 43. A third tube portion 41 corresponds to the tubular portion 41 according to the first embodiment.

The baffle plate 62 is formed in the shape of a disk. A diameter d of the baffle plate 62 is larger than the diameter of the third tube portion 41 and is smaller than an inner diameter D of the second tube portion 31. The heat transfer portion 61 extends perpendicularly to a surface of the baffle plate 62 from a middle of the baffle plate 62 toward an end portion of the third tube portion 41 that is opposite side from the DPF 21. The baffle portion 39 is fixed to the third tube portion 41 while a center axis of the heat transfer portion 61 coincides with a center axis of the third tube portion 41.

The baffle portion 39 is fixed to the third tube portion 41 while the baffle plate 62 and the lid 43 of the third tube portion 41 are spaced apart. That is, of two end portions of the heat transfer portion 61, a proximal end portion which is an end portion closer to the proximal end-side base 30a is inserted in the third tube portion 41, and a distal end portion which is an end portion closer to the DPF 21 protrudes from the third tube portion 41. A ring-shaped first circulating flow production space 31b which surrounds the distal end portion of the heat transfer portion 61 is formed between the baffle plate 62 and the lid 43 serving as a wall portion which surrounds a pre-mixing chamber 31P. The proximal end-side base 30a corresponds to the housing sidewall 30a according to the first embodiment.

The pre-mixing chamber 31P is a space which produces gaseous mixture by mixing air to be used for burning and fuel and includes a first mixing chamber 31P1 and a second mixing chamber 31P2. The first mixing chamber 31P1 is defined by a support plate 32, the proximal end-side base 30a, and an inner peripheral surface of the second tube portion 31. The support plate 32 corresponds to the throttle plate 32 according to the first embodiment. The second mixing chamber 31P2 is defined by an inner peripheral surface of the third tube portion 41 and the lid 43.

A narrow section 31g which is made smaller in flow passage area than the second tube portion 31 by the baffle plate 62 is formed between the baffle plate 62 and the inner peripheral surface of the second tube portion 31. A second circulating flow production space 31c is formed between the baffle plate 62 and the discharge port 38h. The space including the narrow section 31g, the second circulating flow production space 31c, and the first circulating flow production space 31b, i.e., an entire space which is defined by the inner peripheral surface of the second tube portion 31, a dividing plate 34, and the blow-off plate 38 serves as a combustion chamber 31a which burns gaseous mixture. A ignition portion 36a of an ignition plug 36 is disposed between the dividing plate 34 and the baffle plate 62 inside the combustion chamber 31a. The dividing plate 34 corresponds to the perforated plate 34 according to the first embodiment, and the ignition plug 36 corresponds to the ignition section 36 according to the first embodiment.

Operation of Burner

The operation of the burner 30 will be described with reference to FIG. 6. The flow of air is indicated by broken lines while the flow of fluid containing gaseous mixture is indicated by solid lines, in FIG. 6.

Figure 6:
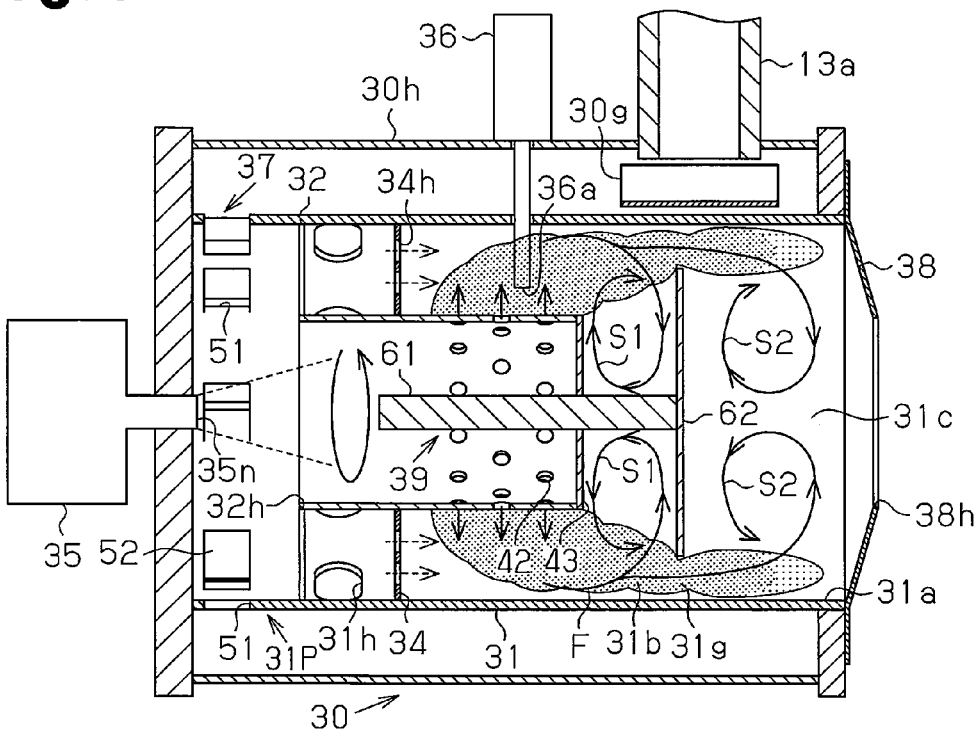
FIG. 6 is a view showing a flow of fluid in the burner according to the second embodiment.

As shown in FIG. 6, when burning of fuel in the burner 30 is started, residuals containing unburned fuel from gaseous mixture and burned gas produced through burning of the gaseous mixture coexist in the combustion chamber 31a. These gases, i.e., fluid inside the combustion chamber 31a flows from the ignition portion 36a of the ignition plug 36 toward the discharge port 38h. During flowing of the fluid from the ignition portion 36a toward the discharge port 38h, a portion of the fluid impinges on the surface of the baffle plate 62. The collision produces a circulating flow S1 in the first circulating flow production space 31b. The circulating flow S1 rotates in a direction different from a swirling direction of a swirling flow inside the pre-mixing chamber 31P to circulate between the upstream side and the downstream side in a flow of fluid traveling from the ignition portion 36a toward the discharge port 38h. In other words, fluid circulates in an up-and-down direction which is a direction along a center axis of the second tube portion 31. Thus, in addition to homogenization of the concentration distribution of fuel in gaseous mixture in a radial direction of the burner 30 in the pre-mixing chamber 31P, the concentration distribution of fuel in fluid containing gaseous mixture and burned gas is homogenized in the up-and-down direction (the direction along the center axis of the second tube portion 31) of the second tube portion 31 in the combustion chamber 31a. Additionally, the production of the circulating flow S1 inside the combustion chamber 31a makes the accumulation period of unburned fuel in the combustion chamber 31a longer. This makes unburned fuel likely to be taken into a flame F and likely to be burned.

A portion of the flame F produced inside the combustion chamber 31a contacts the baffle plate 62 and flows to the narrow section 31g. This disturbs the flame F to cause an increase in the area of the flame F. The shape of the flame F depends on air for burning, the flow velocity of gaseous mixture, fuel concentration, and the like. One example of the shape of the flame F is shown in FIG. 6.

Burned gas and gaseous mixture, i.e., the remainder of the fluid, pass through the narrow section 31g to flow to the downstream side of the baffle plate 62 with increased speed. When the fluid passes through the narrow section 31g, the pressure in a space downstream of the narrow section 31g is decreased. The fluid having passed through the narrow section 31g produces a circulating flow S2 in the second circulating flow production space 31c, and the circulating flow S2 diffuses throughout the second circulating flow production space 31c. The circulating flow S2 circulates between the upstream side and the downstream side in the flow of fluid traveling from the ignition portion 36a toward the discharge port 38h, like the circulating flow S1 produced in the first circulating flow production space 31b. The production of the circulating flow S2 causes the residuals of the gaseous mixture and the burned gas to be further mixed in the up-and-down direction that is a direction along the center axis of the third tube portion 41 immediately before discharge from the discharge port 38h. This further increases the opportunity for unburned fuel to be burned.

The baffle plate 62 contacts and is heated by the flame F increased in area by the baffle plate 62. The baffle plate 62 and a portion of the heat transfer portion 61 exposed to the combustion chamber 31a also contact burned gas. Since the baffle plate 62, in particular, contacts the circulating flows S1 and S2 produced in front of and behind the baffle plate 62, i.e., upstream and downstream of the baffle plate 62 in a direction in which fluid flows, the quantity of heat absorbed from burned gas by the baffle plate 62 increases. For this reason, the temperature of gaseous mixture which swirls along a circumferential direction inside the third tube portion 41 is raised by heat propagated from the heat transfer portion 61 inserted in the third tube portion 41. As a result, liquefaction of fuel vaporized inside the third tube portion 41 is suppressed, and vaporization of liquefied fuel inside the third tube portion 41, if any, is promoted.

The ratio (d/D) of the diameter d of the baffle plate 62 to the inner diameter D of the second tube portion 31 will be described with reference to FIG. 7.

Figure 7:
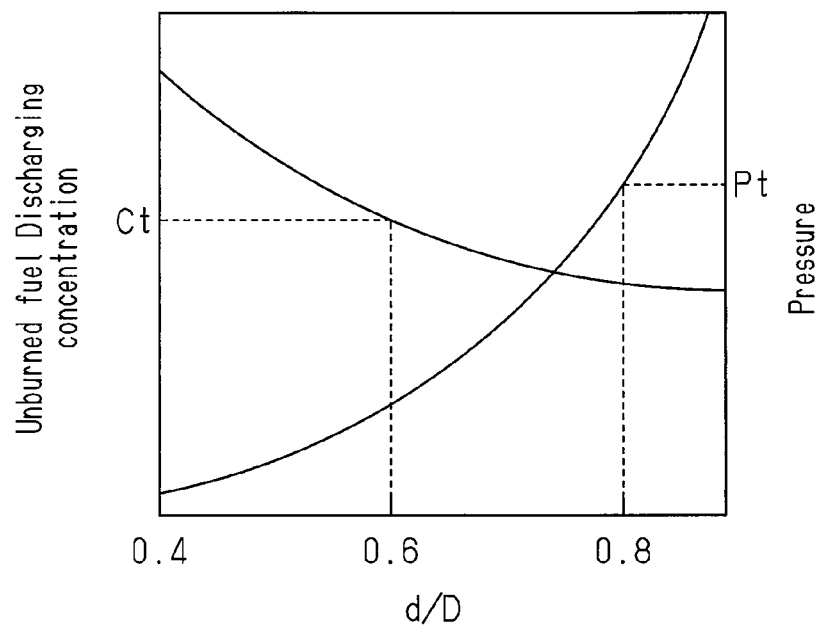
FIG. 7 is a graph showing the relationship between a ratio (d/D) and the concentration of unburned fuel to be discharged, and the relationship between the ratio (d/D) and the pressure at upstream of a baffle plate.

As shown in FIG. 7, the ratio (d/D) influences the mixing efficiency of unburned fuel in the combustion chamber 31a and the pressure upstream of the baffle plate 62, i.e., an upstream-side pressure. The ratio (d/D) is preferably set to a value where the upstream-side pressure is not more than a target pressure Pt and the concentration of unburned fuel (HC) discharged from the burner 30 is not more than a target concentration Ct. The ratio (d/D) is preferably set to be not less than 0.6 and not more than 0.8. If the ratio (d/D) is less than 0.6, the narrow section 31g is large, which decreases the speed of the circulating flow S2 in the second circulating flow production space 31c and leads to an insufficient reduction in the pressure downstream of the narrow section 31g. Thus, burned gas and gaseous mixture do not diffuse sufficiently in the combustion chamber 31a. As a result, the concentration of unburned fuel to be discharged is higher than the target concentration Ct. If the ratio (d/D) is more than 0.8, the narrow section 31g is smaller, and the upstream-side pressure of the baffle plate 62 is higher than the target pressure Pt.

The ratio (L1/L) of a length L1 from the lid 43 to the baffle plate 62 to a length L from the lid 43 to the discharge port 38h will be described with reference to FIG. 8.

Figure 8:
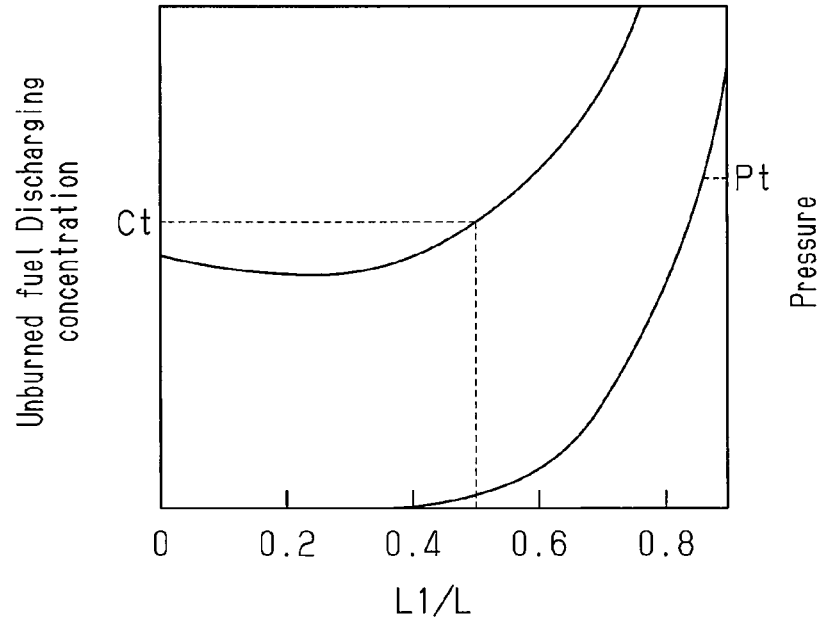
FIG. 8 is a graph showing the relationship between a ratio (L1/L) and the concentration of unburned fuel to be discharged, and the relationship between the ratio (L1/L) and the pressure at upstream of the baffle plate.

As shown in FIG. 8, the ratio (L1/L) influences the diffusion efficiency downstream of the narrow section 31g and the upstream-side pressure of the baffle plate 62. The ratio (L1/L) is preferably set to a value where the upstream-side pressure is not more than the target pressure Pt and the concentration of unburned fuel (HC) discharged from the burner 30 is not more than the target concentration Ct. The ratio (L1/L) is preferably set to be not more than 0.5. If the ratio (L1/L) exceeds 0.5, the concentration of unburned fuel to be discharged exceeds the target concentration Ct. This is estimated to be because the too-long first circulating flow production space 31b lowers the mixing efficiency in the up-and-down direction that is a direction along a center axis of the burner 30.

As has been described above, the burner according to the second embodiment can achieve the effects (advantages) below in addition to the effects (advantages) of the first embodiment.

(9) Since the circulating flow S2, in which burned gas and gaseous mixture circulate, is produced on the downstream side of the baffle portion 39, the accumulation period of unburned fuel inside the combustion chamber 31a is longer. This makes unburned fuel likely to be taken into the flame F and likely to be burned. Additionally, the circulating flow S2 circulates in the up-and-down direction at least at a portion of a flow of fluid traveling from the ignition portion 36a toward the discharge port 38h. Thus, the concentration distribution of unburned fuel is homogenized in the up-and-down direction of the flow of fluid, i.e., in an up-and-down direction that is a direction along the center axis of the second tube portion 31.

(10) Since the baffle portion 39 contacts the circulating flow S1, the quantity of heat absorbed from burned gas by the baffle portion 39 is larger than a case where the baffle portion 39 contacts a laminar flow. For this reason, propagation of heat of the baffle portion 39 to gaseous mixture suppresses liquefaction of vaporized fuel and promotes vaporization of liquid fuel.

(11) In the combustion chamber 31a, the first circulating flow production space 31b is formed between the baffle plate 62 and the lid 43 of the third tube portion 41, and the second circulating flow production space 31c is formed on the downstream side of the baffle plate 62. This increases the opportunity for unburned fuel to be taken into the flame F and be burned. Additionally, since the baffle plate 62 contacts circulating flows at two surfaces which extend to cross an axial direction, the quantity of heat absorbed from burned gas by the baffle plate 62 increases further.

(12) Since the baffle portion 39 includes the elongated heat transfer portion 61 inserted in the pre-mixing chamber 31P, i.e., the heat transfer portion 61 extending along the axial direction, liquefaction of vaporized fuel is suppressed, and vaporization of liquid fuel is promoted, generally in the entirety of the pre-mixing chamber 31P.

(13) Since burned gas and gaseous mixture flow to downstream of the baffle plate 62 with increased speed through the narrow section 31g, the pressure downstream of the baffle plate 62 is reduced, and diffusion of unburned fuel is promoted.

(14) Since the diameter d of the baffle plate 62 is set such that the ratio of the diameter d to the inner diameter D of the second tube portion 31 is not less than 0.6 and not more than 0.8, the pressure upstream of the baffle plate 62 is appropriately adjusted, and the efficiency of mixing of gaseous mixture with burned gas in fluid is improved. This reduces the concentration of unburned fuel discharged from the burner 30.

(15) Since gaseous mixture is mixed not only in the up-and-down direction that is a direction along the center axis of the second tube portion 31 but also in a radial direction of the second tube portion 31, the concentration distribution of unburned fuel can be homogenized not only in a vertical direction of the combustion chamber 31a but also in a radial direction.

The above-described embodiments can also be appropriately changed in the manners below and be implemented.

In the second embodiment, the ratio of the outer diameter d of the baffle plate 62 to the inner diameter D of the second tube portion 31 may be less than 0.6 or may be larger than 0.8. Even with this configuration, effects equivalent to (9) above can be achieved as long as the baffle portion 39 that produces a circulating flow is provided inside the combustion chamber 31a.

Figure 9:
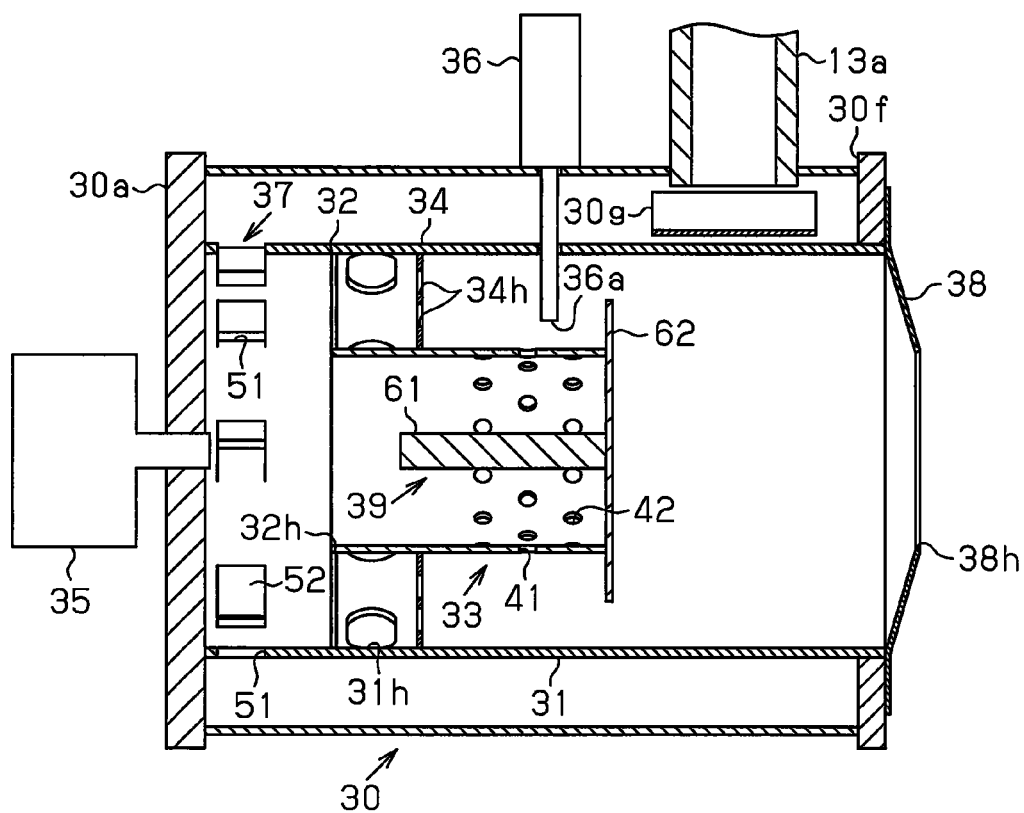
FIG. 9 is a cross-sectional view showing the cross-section structure of a burner according to a modification.

In the second embodiment, the first circulating flow production space 31b is formed between the baffle plate 62 of the baffle portion 39 and the lid 43 of the third tube portion 41. The present invention, however, is not limited to this. For example, as shown in FIG. 9, the first circulating flow production space 31b may be omitted by constructing the lid 43 of the second tube portion 31 using the baffle plate 62 that is formed in the shape of a disk which extends outward in a radial direction from an outer edge at an end portion of the third tube portion 41. With this configuration, the heat transfer portion 61 may have, for example, a shape extending from the baffle plate 62 into the third tube portion 41. Even with this configuration, effects equivalent to (9) above can be achieved as long as a circulating flow is produced downstream of the baffle plate 62.

In the second embodiment, the heat transfer portion 61 may not be formed in the shape of a rod which extends along an axial direction of the burner 30 inside the third tube portion 41. The heat transfer section may be formed, for example, in the shape of a rod which extends along the radial direction of the burner 30 inside the third tube portion 41. Even with this configuration, effects equivalent to (9) above can be achieved as long as the heat transfer section is formed inside the third tube portion 41.

Figure 10:
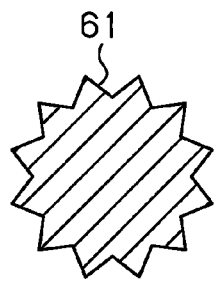
FIG. 10 is a cross-sectional view showing the cross-section structure in a modification of a heat transfer section.
Figure 11:
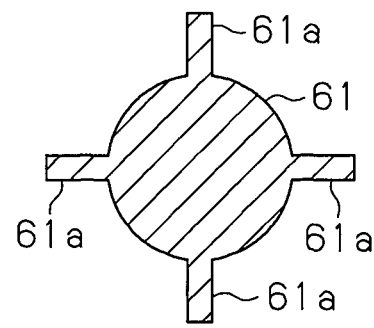
FIG. 11 is a cross-sectional view showing the cross-section structure in a modification of the heat transfer section.

In the second embodiment, the heat transfer portion 61 of the baffle portion 39 is formed in the shape of a rod. The present invention, however, is not limited to this. For example, as shown in FIG. 10, the cross-sectional shape of the heat transfer portion 61 may be a star shape. Alternatively, as shown in FIG. 11, the heat transfer portion 61 may have a plurality of heat transfer plates 61*a* which extend outward in a radial direction from an outer peripheral surface of the heat transfer portion 61. Each heat transfer plate 61*a* is formed in the shape of a plate which extends along the axial direction. The length in the axial direction of each heat transfer plate 61*a* may be equal to the length in the axial direction of the heat transfer portion 61 or may be shorter than the length in the axial direction of the heat transfer portion 61. With this configuration, the heat transfer portion 61 has a larger specific surface area than the heat transfer portion 61 according to the second embodiment. This increases the quantity of heat absorbed from gaseous mixture and burned gas by the heat transfer portion 61.

Figure 12:
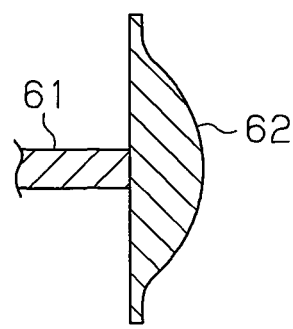
FIG. 12 is a side view showing the side structure in a modification of a circulating flow production portion.

In the second embodiment, for example, as shown in FIG. 12, a back surface of the baffle plate 62 which is arranged on the downstream side may be formed in a streamline shape in a side view. With this configuration, burned gas and gaseous mixture inside the combustion chamber 31*a* flow along the back surface of the baffle plate 62 to cause collision between the burned gas and the gaseous mixture at a middle in a radial direction of the baffle plate 62. This makes a circulating flow likely to be produced inside the combustion chamber 31*a*.

In the second embodiment, the baffle plate 62 of the baffle portion 39 only needs to contact at least burned gas in the combustion chamber 31*a* and may be arranged at a position where the baffle portion 39 does not contact the flame F.

In the second embodiment, the heat transfer portion 61 of the baffle portion 39 may be fixed to the lid 43 and another member. For example, the distal end of the heat transfer portion 61 may be fixed by a plate-like member or the like which is coupled to the inside of the third tube portion 41. In a configuration where the heat transfer portion 61 is fixed by the plate-like member, the plate-like member preferably has a through hole which allows gaseous mixture to pass through.

In the second embodiment, the heat transfer portion 61 is fixed to the third tube portion 41 while the center axis of the heat transfer portion 61 coincides with the center axis of the third tube portion 41. The present invention, however, is not limited to this. The heat transfer portion 61 may be fixed to the third tube portion 41 while the center axis of the heat transfer portion 61 does not coincide with the center axis of the third tube portion 41 and is parallel to the center axis of the third tube portion.

In the second embodiment, the heat transfer portion 61 may not extend perpendicularly to the surface of the baffle plate 62 toward the end portion of the third tube portion 41 opposite to the DPF 21. For example, the heat transfer portion 61 may extend from the surface of the baffle plate 62 while forming a predetermined angle other than an angle of 90° with the surface of the baffle plate 62.

In the second embodiment, a middle portion in the radial direction of one surface of the baffle plate 62 is connected to the end portion of the heat transfer portion 61 closer to the DPF 21. The present invention, however, is not limited to this. A portion other than the middle portion in the radial direction of the one surface of the baffle plate 62 may be connected to the end portion of the heat transfer portion 61 closer to the DPF 21.

In the second embodiment, the blow-off plate 38 provided at the second tube portion 31 may be omitted.

The air supplying holes 31*h* may be formed at positions facing the gaseous mixture outflow holes 42. Even with this configuration, a flow direction of gaseous mixture flowing out through the gaseous mixture outflow holes 42 and a direction of air flowing out through the air supplying holes 31*h* are different from each other. For this reason, effects equivalent to (1) above can be achieved.

Even in a configuration where the air supplying holes 31*h* are formed at positions closer to the filter 21 than the gaseous mixture outflow holes 42, a direction in which gaseous mixture flows and a direction in which air flows are different in the vicinity of the inner peripheral surface of the outer tube portion 31. Although air supplied into the interior of the outer tube portion 31 impinges on the gaseous mixture flowing in the vicinity of the inner peripheral surface of the outer tube portion 31, the air is unlikely to impinge on the gaseous mixture flowing farther inside in the outer tube portion 31.

In contrast, in the above-described burner 30, air flowing in a different direction is supplied to the whole of gaseous mixture flowing out into the above-described clearance, which makes the gaseous mixture and the air more likely to be mixed.

The lid 43 may not be attached to the opening portion of the tubular portion 41 closer to the filter 21. Even with this configuration, gaseous mixture is supplied from the gaseous mixture outflow holes 42 formed in the tubular portion 41 outward in the radial direction in small quantities, which makes the gaseous mixture and air correspondingly more likely to be mixed.

Air flowing out through the air supplying holes 31*h* may be supplied in a direction inclined with respect to the axial direction of the outer tube portion 31. In this case, for example, an opening at the outer peripheral surface of the outer tube portion 31 in each air supplying hole 31*h* may be formed closer to the housing sidewall 30*a* in the axial direction than an opening at the inner peripheral surface of the outer tube portion 31. Even with this configuration, air flowing in a direction different from the direction of the flow of gaseous mixture flowing out through the gaseous mixture outflow holes 42 is supplied to the gaseous mixture. This makes the gaseous mixture and the air likely to be mixed.

A row of holes which includes the gaseous mixture outflow holes 42 arranged along the circumferential direction may be formed at each of three or less positions which are different from each other in the axial direction or may be formed at each of four or more positions which are different from one another.

The plurality of gaseous mixture outflow holes 42 may not be equally spaced in the circumferential direction. The gaseous mixture outflow holes 42 may be formed with a predetermined interval therebetween.

The gaseous mixture outflow holes 42 may be formed only at a portion in the circumferential direction of the tubular portion 41. Even with this configuration, air flowing in a direction different from the direction of gaseous mixture flowing out through the gaseous mixture outflow holes 42 is supplied to the gaseous mixture. This makes the gaseous mixture and the air likely to be mixed.

The perforated plate 34 may be omitted. Even with this configuration, air flowing in a direction different from the direction of gaseous mixture is supplied to a portion of the gaseous mixture. This makes the gaseous mixture and the air likely to be mixed.

A flow of air made to swirl in the air swirl portion 37 may travel as long as flowing in a direction along the circumferential direction of the tubular portion 41. For example, the flow may be a flow which increases gradually in swirling radius while swirling along the circumferential direction of the tubular portion 41 or may be a flow whose swirling radius is kept almost constant. Even with this configuration, the efficiency of mixing of a flow of air and a flow of fuel is improved as long as the direction of the flow of air and the direction of the flow of fuel are different from each other in the air swirl portion 37. A position where the mixing hole 32h is formed and a position where fuel is supplied are preferably provided at positions with high air density in the air swirl portion 37.

The air swirl portion 37 is formed of the bending portions 52 that are cut and raised inward in the radial direction of the outer tube portion 31 from the outer peripheral surface of the outer tube portion 31. The present invention, however, is not limited to this. Each bending portion 52 may be formed of the bending portion 52 that is cut and raised outward in the radial direction of the outer tube portion 31 from the outer peripheral surface of the outer tube portion 31.

The air swirl portion 37 may be omitted. In this case, through-holes which extend through the outer tube portion 31 in the radial direction may be formed at positions where the swirl holes 51 constituting the air swirl portion 37 are formed.

In the first embodiment, the opening area of the mixing hole 32h formed in the throttle plate 32 may be the same as the opening area of the tubular portion 41, as in the second embodiment.

The air swirl portion 37 and the throttle plate 32 may be omitted, and the tubular portion 41 may be fixed to the housing sidewall 30a. In this case, a path which guides air from the air supplying pipe 13a to the tubular portion 41 may be formed between the inner peripheral surface of the outer tube portion 31 and the outer peripheral surface of the tubular portion 41, and a through-hole for letting air flow into the tubular portion 41 may be formed in the tubular portion 41.

The throttle plate 32 may be omitted, and the tubular portion 41 may be fixed to the housing sidewall 30a. In this case, a path which guides air from the air supplying pipe 13a to the tubular portion 41 may be formed between the inner peripheral surface of the outer tube portion 31 and the outer peripheral surface of the tubular portion 41, and a through-hole for letting air flow into the tubular portion 41 may be formed in the tubular portion 41. With this configuration, an air swirl portion can be formed at the tubular portion 41 by forming a bending portion at one of side surfaces in the circumferential direction of the through-hole formed in the tubular portion 41.

The burner housing 30h and the air guide plate 30g may be omitted. In this configuration, the air supplying pipe 13a may be connected to the outer tube portion 31 at least at one of a position between the housing sidewall 30a and the throttle plate 32 in the axial direction and a position between the throttle plate 32 and the perforated plate 34 in the axial direction. The above-described bending portion may be formed at one of sidewalls in the circumferential direction of a connection hole which is formed between the housing sidewall 30a and the throttle plate 32 and connected with the air supplying pipe 13a. With this configuration, air flows into the interior of the outer tube portion 31 while swirling in the circumferential direction of the outer tube portion 31.

The burner housing 30h, the outer tube portion 31, and the tubular portion 41 are not limited to a circular tubular shape and may have a polygonal tubular shape. In short, the burner housing 30h, the outer tube portion 31, and the tubular portion 41 only need to form a tubular shape. In this case, the throttle plate 32 may have the shape of a polygonal plate suited to the shape of the outer tube portion 31. The perforated plate 34 may have the shape of a polygonal ring suited to the shapes of the outer tube portion 31 and the mixing inner tube portion 33.

The fuel supply portion 35 may not supply fuel in a vaporized state into the burner 30 and may supply fuel in droplets.

The flame suppression portion 44 according to the first embodiment may be attached not to the outer peripheral surface of the tubular portion 41 but to the inner peripheral surface of the tubular portion 41. Alternatively, the flame suppression portion 44 may be attached to both the outer peripheral surface and the inner peripheral surface of the tubular portion 41.

The flame suppression portion 44 according to the first embodiment may be embodied as a perforated plate made of various metals.

The flame suppression portion 44 according to the first embodiment may be omitted.

The burner 30 according to the second embodiment may include the flame suppression portion 44.

Various catalysts used to purify exhaust gas may be provided on the downstream side of the burner 30 instead of the filter 21. Alternatively, the filter 21 and a catalyst may be connected in parallel on the downstream side of the burner 30, and burned gas produced through burning in the burner 30 and heated exhaust gas may be supplied to both the filter 21 and the catalyst.

A supplying port of the fuel supply portion 35 is not limited to the housing sidewall 30a and may be provided, for example, to a sidewall of the second tube portion 31.

In addition to the ignition plug 36, at least one of a glow heater, a laser ignition device, and a plasma ignition device may be mounted.

Air used for burning is not limited to intake air flowing through the inlet pipe 13 and may be air flowing through a pipe connected to an air tank of a brake or air supplied from a blower for a burner.

An engine equipped with the exhaust gas purification apparatus 20 is not limited to the diesel engine 10 and may be a gasoline engine.

The invention claimed is:

1. A burner comprising:
a tubular inner tube portion; and
a tubular outer tube portion which surrounds the inner tube portion;
a combustion chamber defined by an inner peripheral surface of the outer tube portion;
an ignition portion operable to ignite a gaseous mixture of air and fuel inside the combustion chamber to burn the gaseous mixture, wherein burned gas is produced through burning of the gaseous mixture;
a mixing hole provided at a first end of the inner tube portion, the mixing hole comprising an inlet of the inner tube portion and wherein the mixing hole comprises a conduit operable to convey the gaseous mixture of the air and the fuel to a second end of the inner tube portion;

a circulating flow production portion operable to contact the gaseous mixture inside the inner tube portion, wherein a fluid inside the combustion chamber impinges on the circulating flow production portion;

the inner tube portion comprising a peripheral wall and a lid on the second end of the inner tube portion;

a fuel supply portion which supplies fuel;

the fuel supply portion provided upstream of the mixing hole, and wherein the fuel supply portion comprises a fuel injection port to provide a fuel to be mixed with air;

the peripheral wall of the inner tube portion comprising a gaseous mixture outflow hole, and wherein the lid is devoid of a hole;

wherein a clearance is defined between the inner peripheral surface of the outer tube portion and an outer peripheral surface of the inner tube portion;

wherein the clearance is in fluid communication with an interior of the inner tube portion through the gaseous mixture outflow hole;

a peripheral wall of the outer tube portion has an air supplying hole, the air supplying hole operable to supply air to the clearance;

one of two end portions of the outer tube portion comprising a discharge port, which is operable to discharge burned gas;

wherein the lid closes one of two end portions of the peripheral wall of the inner tube portion that is closer to the discharge port;

wherein the circulating flow production portion is operable to impinge on a fluid that flows from the ignition portion toward the discharge port and produce a circulating flow of fluid that circulates between an upstream side and a downstream side, and the circulating flow production portion includes a heat transfer section which is inserted in the inner tube portion and extends along a direction parallel to a center axis of the inner tube portion.

2. The burner according to claim 1, wherein
the inner tube portion includes:
a proximal end which is a tube end supplied with the fuel; and
a distal end which is a tube end on the opposite side of the proximal end, and
wherein the distal end of the inner tube portion comprises a plate-like lid.

3. The burner according to claim 2, wherein
the gaseous mixture outflow hole is formed at a part of the inner tube portion closer to the distal end than a middle in an axial direction of the inner tube portion, and
the air supplying hole is formed at a part of the outer tube portion that faces a part of the inner tube portion closer to the proximal end than the middle in the axial direction of the inner tube portion.

4. The burner according to claim 1, wherein
the gaseous mixture outflow hole is one of a plurality of gaseous mixture outflow holes of the inner tube portion;
the plurality of gaseous mixture outflow holes is formed to be spaced apart in a circumferential direction of the inner tube portion; and
the clearance between the outer tube portion and the inner tube portion has a perforated plate attached therein, the perforated plate is formed in the shape of a ring extending along the circumferential direction of the inner tube portion.

5. The burner according to claim 1, further comprising an air swirl portion which supplies air to the inner tube portion while swirling the air along the circumferential direction of the inner tube portion.

6. The burner according to claim 1, further comprising:
a throttle portion arranged between the air swirl portion and the inner tube portion, wherein the throttle portion has a through-hole, which extends through the throttle portion along the axial direction of the inner tube portion;
a flow passage area of the through-hole is smaller than a flow passage area of the inner tube portion, and
the fuel supply portion supplies fuel toward the through-hole.

7. The burner according to claim 1, wherein
the circulating flow production portion includes a baffle plate which impinges on the fluid inside the combustion chamber;
the baffle plate is arranged between the inner tube portion and the discharge port in a direction in which the outer tube portion extends;
the baffle plate defines a first circulating flow production space at an upstream side of the baffle plate between the baffle plate and the outer peripheral surface of the inner tube portion in the combustion chamber, and first circulating flow is operable to be produced in the first circulating flow production space; and
the baffle plate defines a second circulating flow production space at a downstream of the baffle plate in the combustion chamber, wherein a second circulating flow is operable to be produced in the second circulating flow production space.

8. The burner according to claim 7, wherein
a narrow section is formed between a side surface of the baffle plate and the inner peripheral surface of the outer tube portion; and
a flow passage area of the narrow section is smaller than a flow passage area of the inner peripheral surface of the outer tube portion.

9. The burner according to claim 7, wherein a ratio of an outer diameter of the baffle plate to an inner diameter of the outer tube portion is not less than 0.6 and not more than 0.8.

* * * * *